No. 616,241. Patented Dec. 20, 1898.
E. J. KOHLMEYER.
COFFEE POT.
(Application filed Aug. 2, 1898.)
(No Model.)
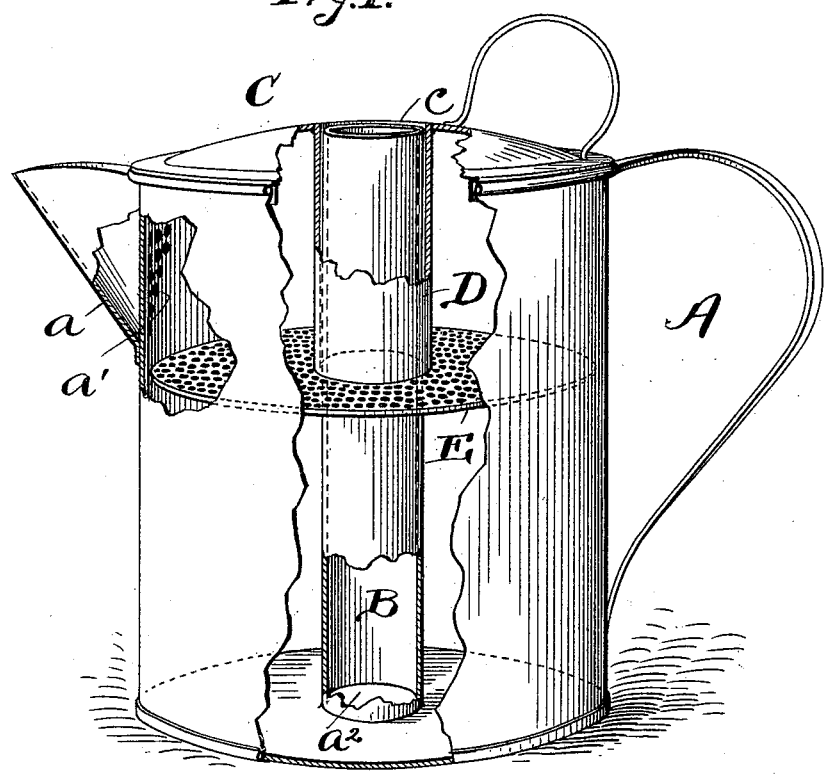
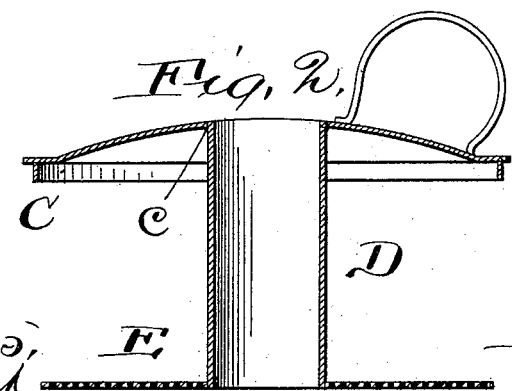
Witnesses:
E. B. Gilchrist
Philip F. Knowlton
Inventor,
Emil J. Kohlmeyer
By Thurston & Bates
his attorneys

UNITED STATES PATENT OFFICE.

EMIL J. KOHLMEYER, OF CLEVELAND, OHIO.

COFFEE-POT.

SPECIFICATION forming part of Letters Patent No. 616,241, dated December 20, 1898.

Application filed August 2, 1898. Serial No. 687,521. (No model.)

*To all whom it may concern:*

Be it known that I, EMIL J. KOHLMEYER, a citizen of the United States, residing at Cleveland, in the county of Cuyahoga and State of Ohio, have invented a certain new and useful Improvement in Coffee-Pots, of which the following is a full, clear, and exact description, reference being had to the accompanying drawings.

The object of the invention is to hold the coffee below the surface of the water while it is being boiled, to prevent the escape of grounds when the coffee is being poured, to reduce the time necessary to boil the coffee, and to accomplish these results with a very cheap and simple construction.

The invention consists in the combination of parts hereinafter described, and pointed out definitely in the claims.

In the drawings, Figure 1 is a perspective view, partly broken away and sectional, of a coffee-pot containing my invention; and Fig. 2 is a central vertical sectional view of the cover therefor and parts attached to the cover.

A represents the pot, having at its upper edge a spout $a$, the outlet to which may be closed by a perforated partition $a'$. A central vertical draft-tube B, open at both ends, is secured to the bottom of the pot in or over a hole $a^2$ therein, and it extends so high that the liquid in the pot will not at any time flow over its top. The desired result is secured by extending the tube slightly above the top of the pot.

C represents the cover of the pot, which may be of the usual convexly-arched form. It has a central hole $c$, over or in which is secured the tube D, which extends downward, is open at both ends, and is of such size as to embrace the tube B. On the lower end of this tube D a perforated partition E is secured, which partition extends across and fits the pot at a point below the entrance to the spout when the cover is in place, as shown in Fig. 1.

In using the described pot the coffee and water are put in and the cover is put on, there being preferably enough water to cover the perforated partition E, wherefore this partition holds all of the coffee below the surface of the water, whereby the full strength of the coffee is obtained. It also prevents any of the coffee from boiling out of the pot either over the top or through the spout. Moreover, the vertical flue formed by the tubes B and D permits the heat to pass up through it, whereby the water is more quickly boiled and the burning out of the bottom is prevented. The partition E also prevents the escape of the coffee-grounds through the spout when the coffee is being poured.

Having described my invention, I claim—

1. The combination of the pot having a hole in its bottom and an open-ended tube B secured to the bottom in a vertical position over said hole, with a cover having a hole, an open-ended tube D extending downward from the cover and secured thereto over the hole, said tube being adapted to embrace the tube B, and a perforated partition which fits the pot and is secured upon the tube D, substantially as specified.

2. The combination of the pot having a spout near its upper edge, and a hole in its bottom, and an open-ended tube B secured to the bottom over said hole, and extending vertically above the top of pot, with a convexly-arched cover having a hole, a tube D secured to said cover over said hole and extending downward therefrom and a perforated partition which fits across the pot and is secured to the lower end of said tube D, the point of attachment being such that when the cover is in place this partition is below the opening to the spout, substantially as specified.

3. The combination of a pot having a spout extending from its side, and having a hole in the center of its bottom, an open-ended tube B secured to the bottom over said hole and extending vertically above the top of the pot, a cover rising at its center more than the distance said tube extends above the top of the pot and having a hole through its center, the perforated disk E of substantially the diameter of the pot and having a hole through its center large enough to go over the tube B, a tube D of greater diameter than the tube B and of greater length than the distance from the top of the pot to the bottom of the spout, said tube D being secured at one end to the center of the cover and at the other to the center of the partition, whereby a removal of the cover removes the perforated disk, and when the cover is in place the disk is necessarily in place to prevent the coffee-grounds rising and strain the coffee in pouring, all constructed and arranged substantially as described and operating as and for the purpose specified.

In testimony whereof I hereunto affix my signature in the presence of two witnesses.

EMIL J. KOHLMEYER.

Witnesses:
E. L. THURSTON,
PHILIP E. KNOWLTON.